(12) United States Patent
Kimura

(10) Patent No.: US 6,883,789 B2
(45) Date of Patent: Apr. 26, 2005

(54) MACHINE TOOL MAIN SHAFT BALANCER

(75) Inventor: Seiji Kimura, Osaka (JP)

(73) Assignee: Pascal Engineering Corporation, Kwanishi (JP)

( * ) Notice: Subject to any disclaimer, the term of this patent is extended or adjusted under 35 U.S.C. 154(b) by 25 days.

(21) Appl. No.: 10/468,693

(22) PCT Filed: Feb. 15, 2002

(86) PCT No.: PCT/JP02/01327
§ 371 (c)(1),
(2), (4) Date: Aug. 21, 2003

(87) PCT Pub. No.: WO02/066204
PCT Pub. Date: Aug. 29, 2002

(65) Prior Publication Data
US 2004/0070124 A1 Apr. 15, 2004

(30) Foreign Application Priority Data
Feb. 22, 2001 (JP) ........................... 2001-046402

(51) Int. Cl.$^7$ .......................... F16M 11/00; F16M 5/00
(52) U.S. Cl. ..................... 267/137; 267/64.11
(58) Field of Search ................ 267/119, 217, 267/64.11, 64.13, 64.28, 137; 188/325

(56) References Cited

U.S. PATENT DOCUMENTS 4,741,518 A * 5/1988 Wallis ....................... 267/75
4,749,013 A 6/1988 Ducate, Sr.
4,792,128 A 12/1988 Holley
5,098,071 A 3/1992 Umetsu
5,265,852 A * 11/1993 Taylor ....................... 267/119

FOREIGN PATENT DOCUMENTS

| JP | 2000-153418 | 6/2000 |
| JP | 2001-105256 | 4/2001 |

* cited by examiner

Primary Examiner—Xuan Lan Nguyen
(74) Attorney, Agent, or Firm—Darby & Darby

(57) ABSTRACT

A machine tool main spindle balancer wherein the annular sealing members of a gas spring that supports the main spindle unit to reduce the load of an elevating mechanism are easily replaceable.

A gas spring of a machine tool main spindle balancer comprises a cylinder body, which is filled with a compressed gas, a rod that extends downward from the inside of cylinder body, a head-side end wall member of cylinder body having a filling valve, a sleeve member forming a circumferential wall around a rod insertion hole mounted hermetically and detachably on a rod-side end wall member, and annular sealing members and mounted on said sleeve member, so that annular sealing members can be replaced easily by discharging the compressed gas, and removing only sleeve member while holding rod on head-side end wall member.

3 Claims, 6 Drawing Sheets

MACHINE TOOL MAIN SHAFT BALANCER

BACKGROUND OF THE INVENTION

1. Field of the Invention

The present invention relates to a balancer for the main spindle unit of a machine tool, especially, a balancer that makes it easy to replace annular sealing members of a gas spring provided for supporting the main spindle unit to reduce the load of an elevating mechanism that drives the main spindle unit up and down.

2. Description of the Related Art

A machine tool such as a machining center generally has a main spindle unit that has a main spindle on which a tool is mounted and an electric motor that drives the main spindle rotationally, wherein such a main spindle unit is supported and moved up and down by means of an elevating mechanism. This kind of elevating mechanism is normally equipped with a vertically arranged ball screw shaft, a ball screw nut that engages with said ball screw and is connected to said main spindle unit, and an electric motor, wherein the main spindle unit moves up and down together with the ball screw nut as the ball screw shaft is turned by the electric motor.

However, it is necessary to move a heavy main spindle unit up and down by means of an elevating mechanism in this kind of machine tool, so that the load of the elevating mechanism is heavy, consequently affecting the positioning accuracy of the main spindle unit in the vertical direction and making it difficult to increase the speed of the vertical motion of the main spindle unit. Moreover, such an elevating mechanism that supports a heavy main spindle unit tends to be large in size and is expensive to manufacture.

The applicant of the present application has developed a system that uses a gas spring as a main spindle head balancer and succeeded in making it practically useful. This main spindle unit balancer generates an upward thrust that substantially equal to the weight of the main spindle unit by means of the gas spring in order to reduce the load applying on the elevating mechanism.

As shown in FIG. 6, a gas spring 101 of this main spindle unit balancer 100 comprises a cylinder body 102 filled with a compressed gas G and a rod 103 that extends downward through a rod-side end wall member 105 of this cylinder body 102. A head side end wall member 104 of cylinder body 102 is provided with a filling valve 106 for filling the compressed gas G into cylinder body 102. A nut member 107 is provided on the upper end of rod 103, being screwed onto it and preventing it from slipping away from rod-side end wall member 105. The height of cylinder body 102 is substantially equal to the stroke of rod 103.

In order to prevent the compressed gas G in cylinder body 102 from leaking and gradually losing the gas pressure, rod-side end wall member 105 is provided with a pair of annular sealing members 108 and 109 sealing between rod-side end wall member 105 and rod 103. Annular sealing members 108 and 109 have to be replaced periodically as they wear out due to frictional sliding of rod 103.

However, while it is necessary to replace annular sealing members 108 and 109 periodically in said main spindle head balancer 100, the replacement also requires gas spring 101 itself to be removed from the main spindle unit, which necessitates in turn a space beneath the main spindle for the removal. This presents some restrictions on the design of the main spindle unit in that the location of gas spring 101 has a certain limitation and that a consideration from the standpoint of maintenance work is required in determining the stroke of the main spindle unit. Moreover, the replacement work is more time-consuming.

The purpose of the present invention is to provide a balancer for the machine tool main spindle unit that makes it possible to easily replace the annular sealing members without having to remove the gas spring.

SUMMARY OF THE INVENTION

On a machine tool equipped with a main spindle unit that has a main spindle on which a tool is mounted and an electric motor that drives the main spindle rotationally, wherein the main spindle unit is supported and moved up and down by means of an elevating mechanism, a balancer for the machine tool main spindle unit according to this invention is a gas spring including a cylinder body filled with a compressed gas and a rod that extends downward from the inside of said cylinder body, wherein the gas spring is provided vertically for supporting said main spindle unit in order to reduce the load of the elevating mechanism, said cylinder body has a head-side end wall member and a rod-side end wall member for hermetically sealing the compressed gas, a filling valve is provided on said head-side end wall member for filling the compressed gas, a sleeve member is provided to form a wall around a rod insertion hole on the rod-side end wall member, and a pair of annular seals are provided on the sleeve member in order to make it possible to allow this sleeve member to be sealed hermetically against the rod and yet to be removably mounted on rod-end side wall member.

The replacement of the annular sealing members is done by moving the main spindle head to its lowest position by means of the elevating drive means causing the upper end of the rod to abut against the head-side end wall member, and removing the filling valve to vent the compressed gas inside the cylinder body. After the compressed gas is vented, allow the main spindle unit to rise while holding the rod against the head-side end wall member, remove the sleeve member from the rod-side end wall member, and replace the annular sealing members mounted on the sleeve member. After the replacement, mount the sleeve member again on the rod-side end wall member, mount the filling valve by removing the bolt, and fill the cylinder body with the compressed gas. Thus, the annular sealing members can be replaced without removing the gas spring.

It can also be configured in such a way that, in replacing said annular sealing members, the sleeve member is made removable after having said filling valve been removed to vent the compressed gas from the cylinder body and the rod been secured in place by fastening the bolt that had been inserted through the filling valve inserting hole of the head-side end wall member to the upper end of the rod. In order to replace the annular sealing members, the main spindle unit is lowered to its lowest position by means of the elevating drive means to cause the upper end of the rod to abut the head-side end wall member, and vent the compressed gas in the cylinder body by removing the filling valve. Insert the bolt into the filling valve mounting hole while the compressed gas is vented, and connect the upper end of the rod with the head-side end wall member. Raise the main spindle unit under this condition, remove the sleeve member from the rod-side end wall member, and replace the annular sealing members.

The sleeve member can be fastened to the rod-side end wall member with a plurality of bolts if so desired. The bolts can be removed to allow only the sleeve to be removed when replacing the annular sealing members, while the bolts can be tightened rigidly to prevent the sleeve members from coming off from the rod-side end wall member under the gas pressure of the compressed gas when the sleeve is installed.

PREFERRED EMBODIMENT OF THE INVENTION

A preferred embodiment of the invention referring to the accompanying drawings is described below.

The preferred embodiment shows a case wherein the invention is applied to a vertical machining center.

Figure 1:
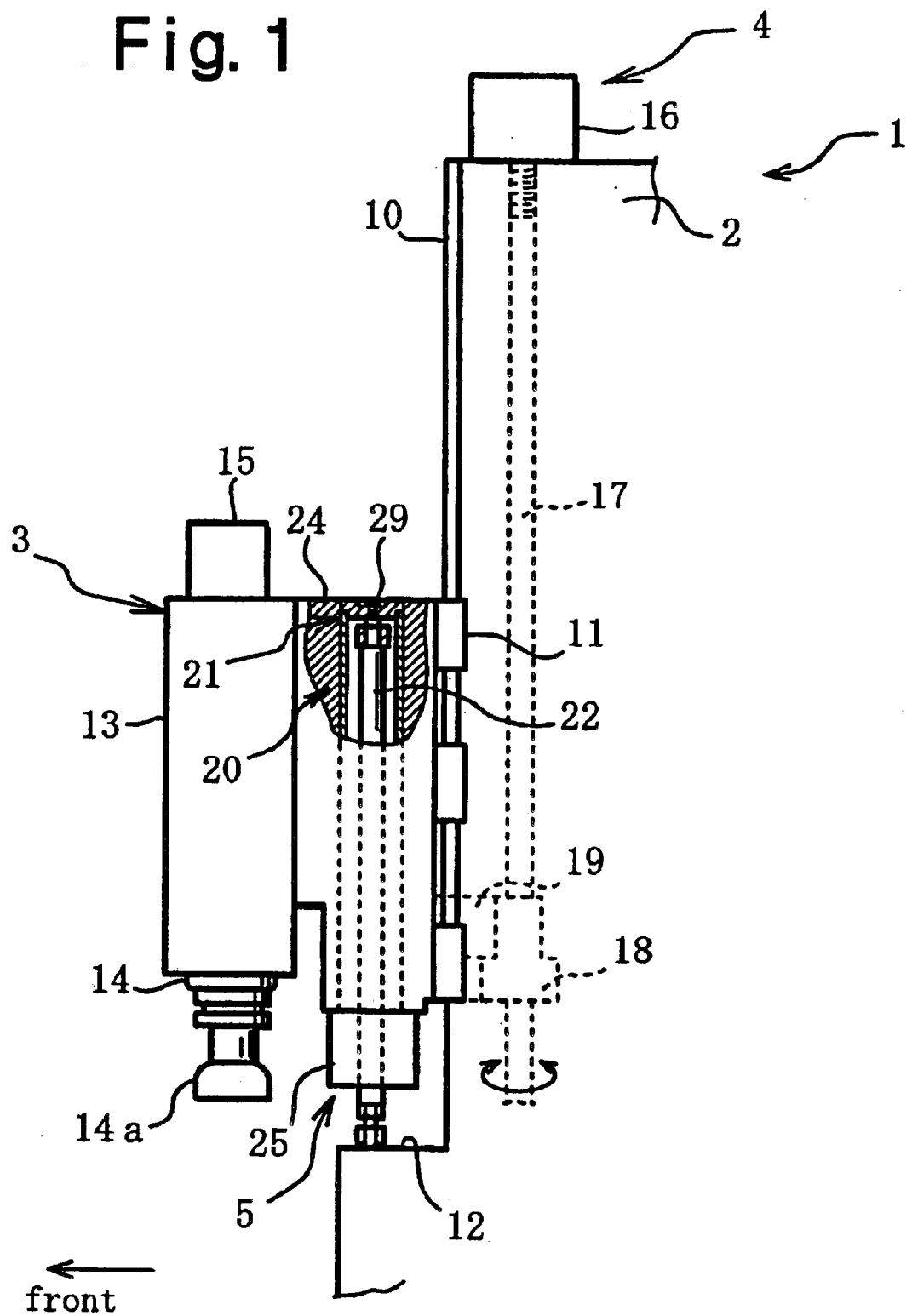
FIG. 1 shows the side view of a machine tool (under a normal operating condition) having a machine tool main spindle balancer according to the present invention.

As shown in FIG. 1, a machine tool 1 comprises a column 2, a main spindle unit 3 that travels up and down guided by column 2, and an elevating mechanism 4 that drives main spindle unit 3 up and down, wherein machine tool 1 is also provided with a machine tool main spindle balancer 5 comprising a gas spring 20 for supporting main spindle unit 3 to reduce the load of elevating mechanism 4.

On the front end of column 2, vertical guide rails 10 are provided for guiding the up and down motion of main spindle unit 3, and a plurality of sliders 11 affixed to the rear end of frame member 13 of main spindle unit 3 engage slidably with guide rails 10. A receiving part 12 is provided at the front side of the lower end of column 2 with which the lower end of rod 22 of gas spring 20 abuts.

Main spindle unit 3 comprises a frame member 13, a main spindle 14, which is supported at the front of said fame member 13 in such a way as to be able to rotate freely around a vertical axis and at the bottom of which a tool 14a is detachably mounted, and an electric motor 15 that drives main spindle 14 rotationally. Electric motor 15 is mounted on the top of frame member 13 and is directly coupled to main spindle 14.

Elevating mechanism 4 comprises an electric motor 16 attached to the upper end of column 2, a ball screw shaft 17 that is connected to said electric motor 16 and extends downward, and a ball screw nut 18 screwed on ball screw shaft 17. As ball screw nut 18 is connected to spindle unit 3 via a connecting part 19, main spindle unit 3 is driven upward or downward together with ball screw nut 18 as ball screw shaft 17 is driven rotationally by means of electric motor 16.

Next, described in detail is the machine tool main spindle balancer 5.

As shown in FIG. 1, main spindle balancer 5 comprises a gas spring 20 provided in a vertical position, and said gas spring 20 supports main spindle unit 3 to reduce the load of elevating mechanism 4 that drives spindle 3 up and down.

Figure 3:
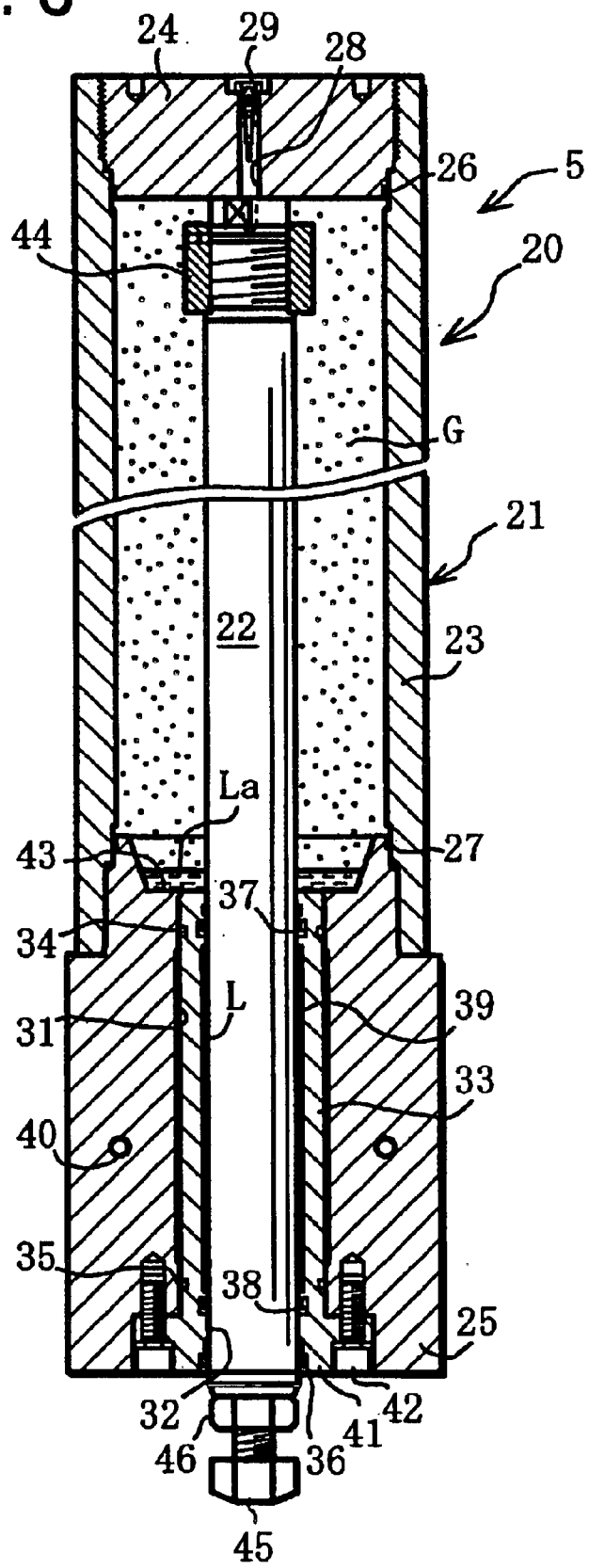
FIG. 3 is a vertical cross sectional view of said machine tool main spindle balancer (under a normal operating condition)

As shown in FIG. 3, gas spring 20 comprises a cylinder body 21 filled with a compressed gas G (nitrogen gas compressed to a pressure of 7 to 10 MPa) and a rod 22 that extends downward from the inside of said cylinder body 21.

Cylinder body 21 comprises a cylinder wall member 23 that fits inside frame member 13 of main spindle unit 3, a circular plate shaped head-end wall member 24 and a substantially rectangular column shaped rod-side end wall member 25 that seal the compression gas G hermetically at the top and bottom of cylinder wall member 23 respectively. Head-side end wall member 24 is screwed on internally to the upper end of cylinder wall member 23 via a sealing member 26. Rod-side end wall member 25 is screwed on internally to the lower end of cylinder wall member 23 via a sealing member 27.

Figure 5:
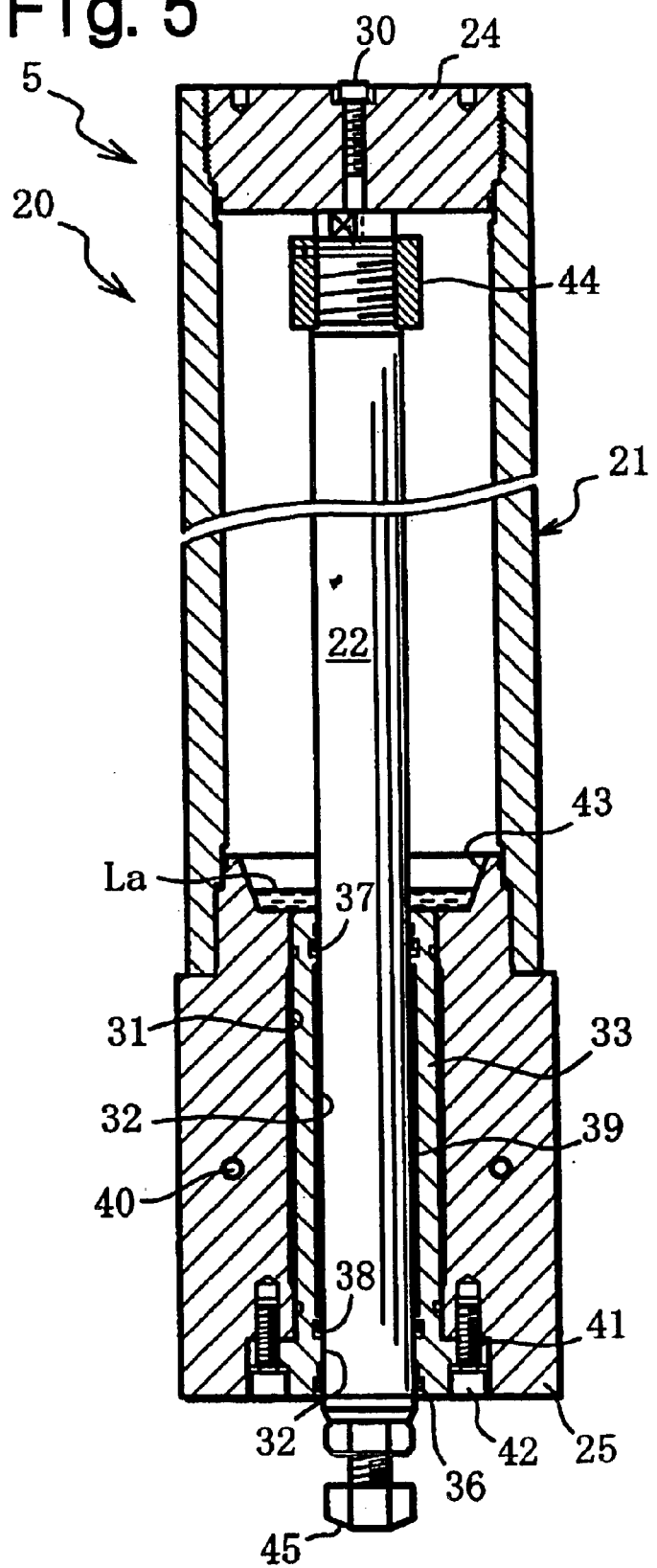
FIG. 5 is a vertical cross sectional view of said machine tool main spindle balancer (under a rod holding condition)
Figure 6:
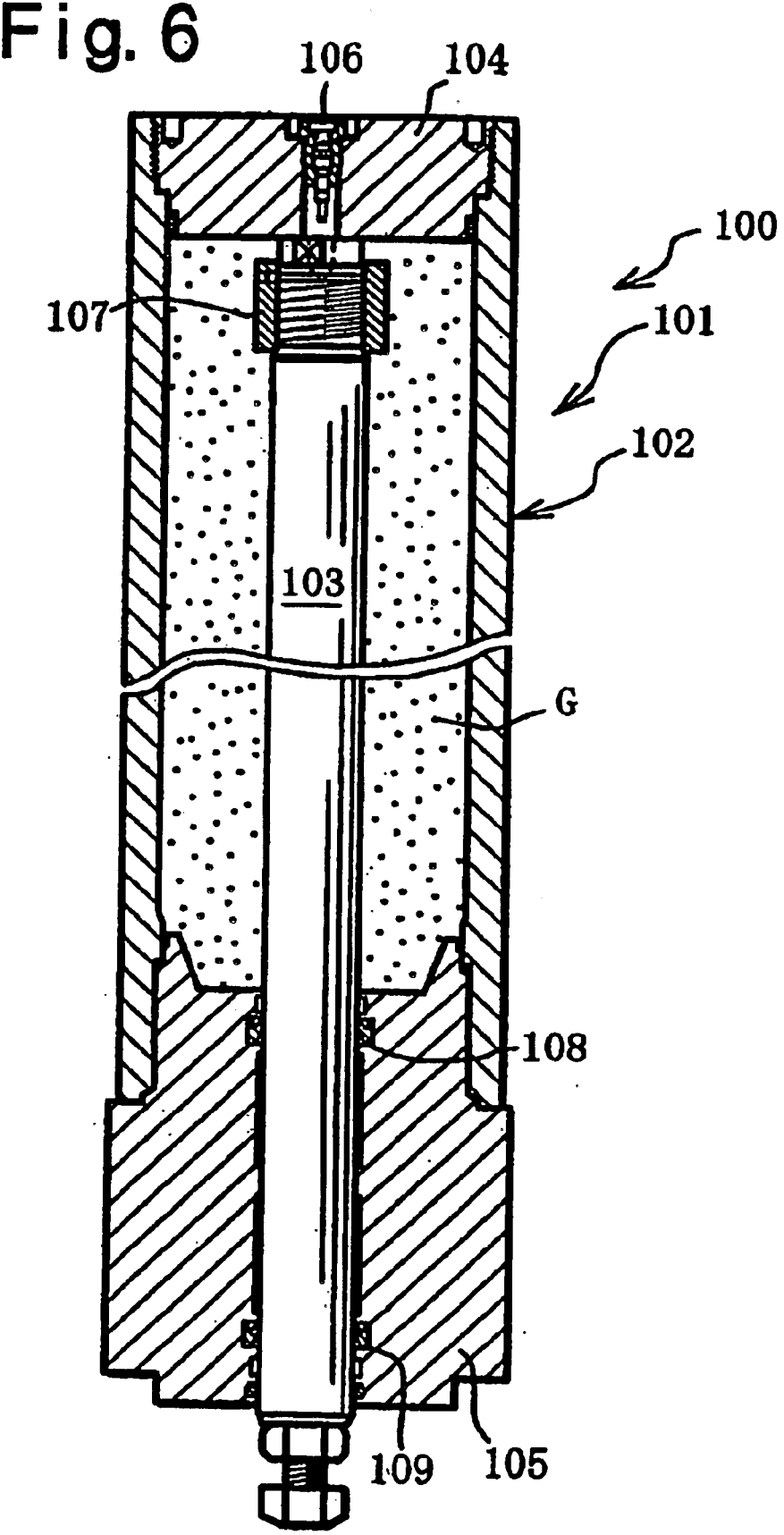
FIG. 6 is a vertical cross sectional view of a machine tool main spindle balancer of the prior art.

A filling valve mounting hole 28 is formed extending vertically and concentric with the axis of head-side end wall member 24, and a filling valve 29 is provided for filling the compressed gas in filling valve mounting hole 28 to allow compressed gas G to be filled in the inside of cylinder body 21. In order to replace annular sealing members 37 and 38 to be described later, a bolt 30 is inserted through filling valve mounting hole 28 as shown in FIG. 5 while the compression gas G is discharged from cylinder body 21 by removing filling valve 29 and bolt 30 is used to connect the upper end of rod 22 to head-side end wall member 24 to hold rod 22 in place.

A through hole 31 is formed in the center of rod-side end wall member 25 to go vertically through rod-side end wall member 25, and a cylindrical sleeve member 33 is provided in said through hole 31 to form a circumferential wall around rod through hole 32 for rod-side end wall member 25. Sleeve member 33 is mounted hermetically and detachably to through hole 31 of rod-side end wall member 25 via sealing members 34 and 35.

Figure 4:
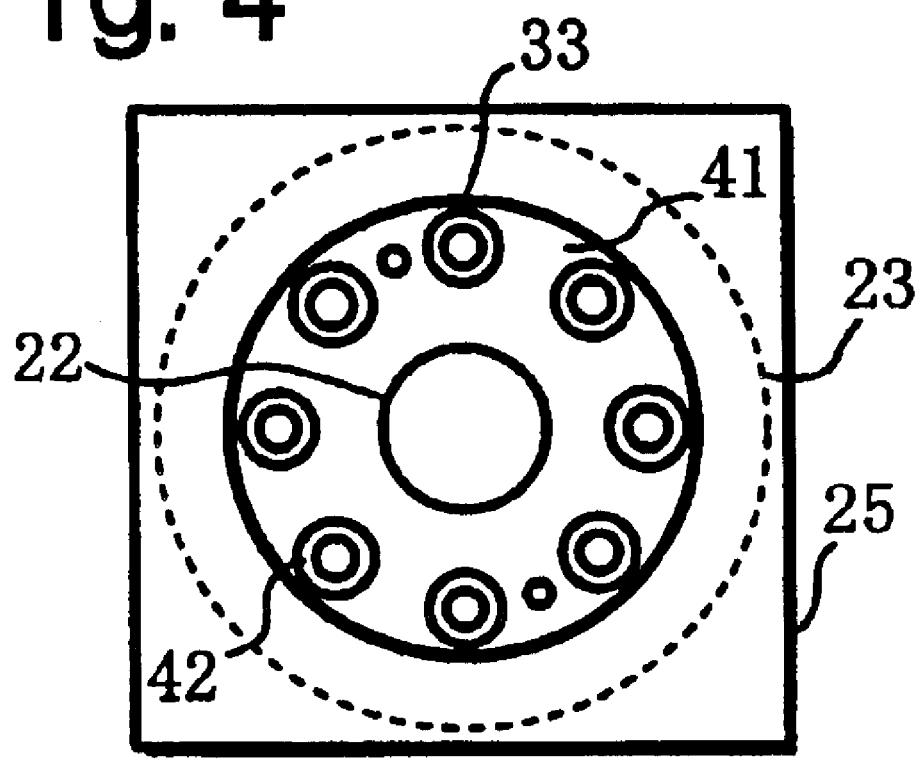
FIG. 4 is the bottom view of said machine tool main spindle balancer.

The inner circumferential surface of sleeve member 33 that forms rod insertion hole 32 is provided with a dust seal 36 for preventing intrusions of cutting chips and dusts and a pair of annular sealing members 37 and 38 for sealing between it and rod 22, a cylindrical oil filling gap 39 is formed on these sealing members 37 and 38, and a lubricant oil L is charged in oil filling gap 39 via an oil passage 40. The lubrication oil L lubricates the sliding motion of rod 22 relative to sleeve 33 and also serves as the seal between rod 22 and sleeve member 33. A flange 41 is formed at the lower end of sleeve member 33, and flange 41 of sleeve member 33 is fastened to the lower end of rod-side end wall member 25 by means of eight bolts 42 as shown in FIG. 4. Therefore, annular sealing members 37 and 38 can be replaced by removing sleeve member 33 from rod-side wall end member 25 by freeing it by means of removing these bolts 42.

A conical oil filling cavity 43 is formed at the upper end of rod-side end wall member 25 in the lower part of cylinder body 21, and oil filling cavity 43 is filled with the lubricant oil La for sealing the compressed gas G.

Rod 22 penetrates slidably through rod insertion hole 32 from the inside of cylinder body 21 and extends downward. Nut member 44 is screwed on the outside of the upper end of rod 22 and locked by a pin for preventing rod 22 from slipping off cylinder body 21. Nut member 44 is larger in diameter than rod insertion hole 32 and is smaller than through hole 31. When nut member 44 is abutting the bottom surface of oil filling cavity 43, rod 22 is in the most advanced position relative to cylinder body 21 (spindle unit 3 is at the top most position). When the upper end of rod 22 is abutting head-side end wall member 24, rod 22 is in the most retracted position relative to cylinder body 21 (main spindle unit 3 is at the lowest position at this time). A height adjustment bolt 45 is provided at the lower end of rod 22, and bolt 45 is affixed to rod 22 at the adjusted position by means of nut 46. When cylinder body 21 is filled with the compressed gas G, said bolt 45 is abutting receiving part 12 of column 2.

Next, described are the actions and effects of machine tool main spindle balancer 5.

When main spindle unit 3 is driven downward by elevating mechanism 4, cylinder body 21 of gas spring 20 moves downward together, thus causing rod 22 to retract into cylinder body 21, as shown in FIG. 1. Also, when main spindle unit 3 is driven upward by elevating mechanism 4, cylinder body 21 of gas spring 20 moves upward together, thus causing rod 22 to advances relative to cylinder body 21. Since vertically positioned gas spring 20 filled with the compression gas G is generating an upward force that is substantially equal to the weight of main spindle unit 3 during the up and down motions of main spindle unit 3, main spindle unit balancer 5 supports main spindle unit 3 and reduces the load of elevating mechanism 4.

In gas spring 20, a pair of annular sealing members 37 and 38 mounted on sleeve member 33 develops wears due to frictional rubbing of rod 22. When wears of annular sealing members 37 and 38 progress, leaking of the compressed gas G occurs between rod 22 and sleeve member 33 and necessitates the replacement of annular sealing members 37 and 38.

In order to replace annular sealing members 37 and 38, it is necessary to lower main spindle unit 3 to the lowest position by means of elevating mechanism 4 to make the upper end of rod 22 to abut against head-side end wall member 24 and remove filling valve 29 to discharge the compressed gas G in cylinder body 21, as shown in FIG. 1 and FIG. 3. Next, while the compressed gas G is discharged, bolt 30 is inserted through filling valve mounting hole 28 as shown in FIG. 5, and bolt 30 is then connected to the upper end of rod 22 to hold rod 22 affixed to head-side end wall member 24.

Figure 2:
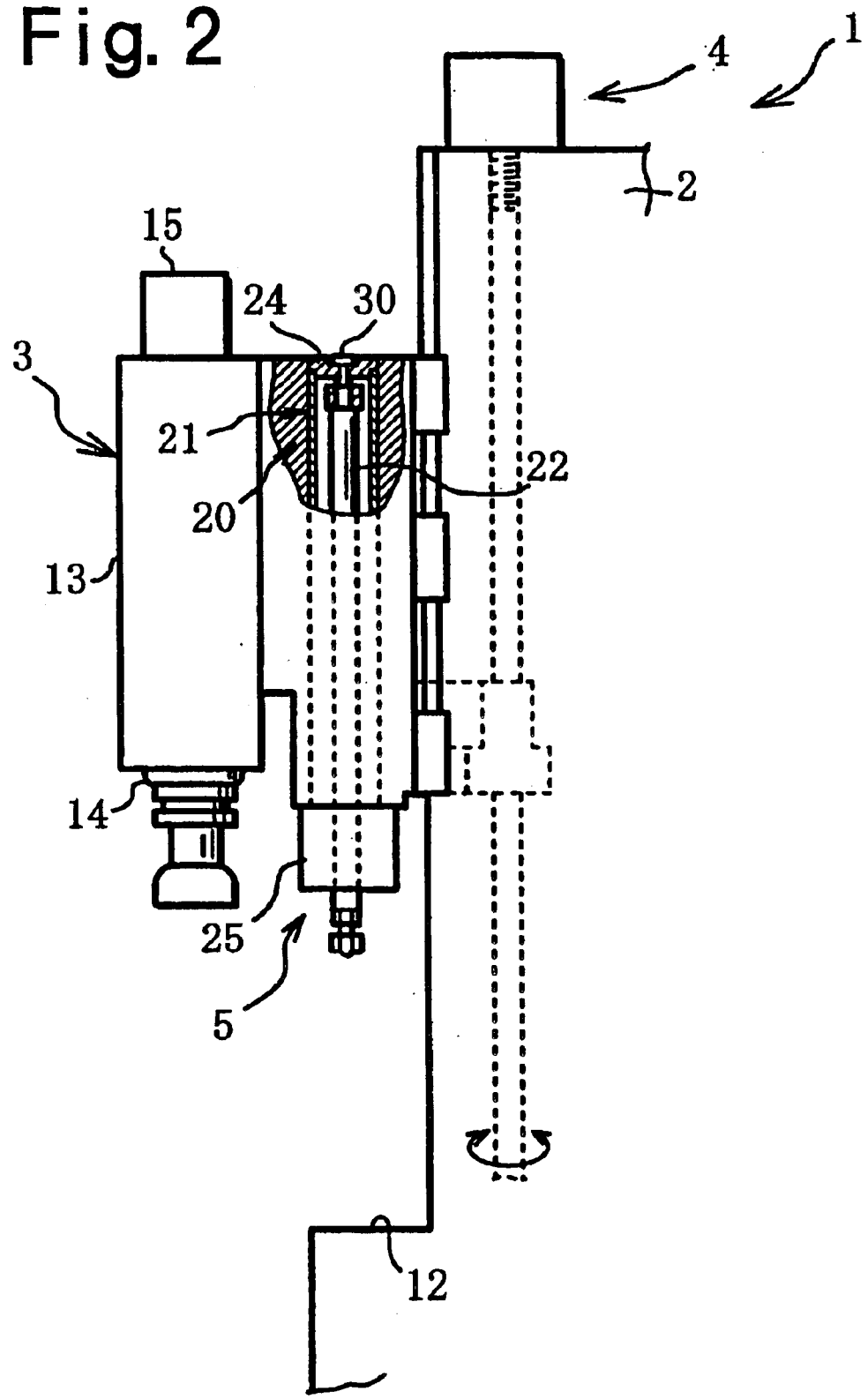
FIG. 2 is a side view of the machine tool (under a rod holding condition) having said machine tool main spindle balancer.

Next, when main spindle unit 3 is raised by means of elevating mechanism 4 as shown in FIG. 2, rod 22 moves upward together with cylinder body 21, so that the lower end of rod 22 becomes separated from receiving part 12. At this time, remove eight bolts 42 used for affixing sleeve member 33 to rod-side end wall member 25 to release it, and pull sleeve member 33 downward out of rod-side end wall member 25 so that annular sealing members 37 and 38 attached to sleeve member 33 can be replaced. It is not necessary at this time to raise main spindle unit 3 to its uppermost position, but rather to secure a sufficient space underneath main spindle unit 3 for removing sleeve member 33. After replacing the sealing members, mount sleeve member 33 onto rod-side end wall member 25 again, remove bolt 30, attach filling valve 29, and fill cylinder body 21 with the compressed gas G.

As can be seen from the above, in the machine tool main spindle balancer 5, annular sealing members 37 and 38 can be replaced by removing only sleeve member 33, and it is not necessary to remove gas spring 20 itself from main spindle unit 3, so that it is not necessary to secure space for removing gas spring 20 from main spindle unit 3, the freedom in placing gas spring 20 can be enhanced greatly. Moreover, the replacement of annular sealing members 37 and 38 is simplified and the man-hours required for the replacement can be substantially reduced.

Since sleeve member 33 is affixed to rod-side end wall member 25 by eight bolts 42 as shown in FIG. 4, it is possible in the replacement of annular sealing members 37 and 38 to remove sleeve member 33 only by removing bolts 42, while it is possible to rigidly fasten sleeve member 33 so that sleeve member 33 would not come off from rod-side end wall member 25 due to the gas pressure of the compressed gas G.

Since nut member 44 attached to rod 22 is larger in diameter than rod insertion hole 32 and is smaller than through hole 31, it serves not only for preventing rod 22 from coming off, but also, if there is a need of removing rod 22, for allowing rod 22 to be removed by only removing sleeve member 33, thus minimizing the man-hour required for the removal.

Next, described below are some variations of the above embodiment in the following:

1) It is not necessary to fill between annular sealing members 37 and 38 as well as at the upper end of rod-side end wall member 25 with the lubrication oils L and La. If the lubrication oils L and La are not used, there is no need for the external oil filling device connected to oil passage 40. Although the use of only annular sealing members 37 and 38 for sealing may increase the frequency of their replacements, there is no need for venting the lubrication oils L and La, so that the replacement work becomes further easier.

2) Sleeve member 33 can be screwed internally onto through hole 31 of rod-side end wall member 25. In such a case, sleeve member 33 is affixed more rigidly onto rod-side end wall member 25, and the number of affixing bolts 42 can be reduced.

As the annular sealing members can be replaced without having to replace the gas spring, there is no need for securing the space for removing the gas spring below. Therefore, a greater freedom can be obtained in placing the gas spring and in terms of the selection of the gas spring stroke, thus resulting in fewer restrictions in designing the main spindle unit. Moreover, since the replacement of the annular sealing member can be done more easily, the man-hour requirement for the replacement can be substantially reduced.

What is claimed is:

1. A machine tool main spindle balancer of a machine tool with a main spindle unit, which is equipped with a main spindle to which a tool is mounted and an electric motor for driving said main spindle, and is driven up and down by means of an elevating mechanism, comprising:

a gas spring, comprising a cylinder body filled with a compressed gas and a rod that extends from the inside of said cylinder body downward, and is arranged in a vertical position to support said main spindle unit to reduce the load of said elevating mechanism, wherein said cylinder body has a head-side end wall member and a rod-side end wall member that hermetically seal a compressed gas, said head-side end wall member having a filling valve for filling the compressed gas, said rod-side end wall member having a sleeve member that constitutes a circumferential wall around a rod insertion hole, said sleeve member being hermetically and detachably mounted on said rod-side end wall member, and said sleeve member also being provided with annular sealing members for sealing between said sleeve member and said rod, and, wherein said sleeve member can be removed after removing said filling valve for discharging the compressed gas in the cylinder body and then holding said rod in place with a bolt inserted through a filling valve mounting hole provided on said head-side end wall member, on an upper end of said rod.

2. A machine tool main spindle balancer described in claim 1, wherein said sleeve member is affixed on said rod-side end wall member with a plurality of bolts.

3. A method to replace an annular sealing member for a main spindle balancer of a machine tool with a main spindle unit, which is equipped with a main spindle and an electric motor for driving said main spindle, and is driven up and down by means of an elevating mechanism, a gas spring, which is equipped with a cylinder body filled with a compressed gas and a rod that extends from the inside of said cylinder body down ward, and is arranged in a vertical position to support said main spindle unit to reduce the load of said elevating mechanism, wherein said cylinder body has a head-side end wall member and a rod-side end wall member that hermetically seal a compressed gas, said head-side end wall member having a filling valve for filling the compressed gas, and said rod-side end wall member having a sleeve member that constitutes a circumferential wall around a rod insertion hole, said sleeve member being hermetically mounted on said rod-side end wall member, and said sleeve member also being detachably provided with annular sealing members for sealing between said sleeve member and said rod, comprising the steps of:

lowering said main spindle unit to a lowest position;

discharging said compressed gas;

holding said rod in place;

removing said sleeve member;

removing said filling valve to discharge said compressed gas; and inserting a bolt into a filling valve mounting hole provided on said head-side end wall, on an upper end of said rod to hold said rod in place.

* * * * *